United States Patent [19]
Nakamoto et al.

[11] 3,858,635

[45] Jan. 7, 1975

[54] COMPOSITE OF A METALLIC MATERIAL AND VULCANIZED RUBBER AND PROCESS FOR PRODUCTION THEREOF

[75] Inventors: Yuzuru Nakamoto; Eishi Kubota; Kazuhiko Sakamoto; Koji Okuda; Takaaki Imamura; Shigeshia Sano; Fukushi Suzuki, all of Tokyo, Japan

[73] Assignee: Bridgestone Tire Co., Ltd., Tokyo, Japan

[22] Filed: June 19, 1972

[21] Appl. No.: 264,337

[30] Foreign Application Priority Data
June 21, 1971  Japan.................................. 46-44648
Jan. 8, 1972   Japan.................................. 47-4845

[52] U.S. Cl.................. 152/330, 117/50, 117/71 M, 117/128, 152/359, 152/361 R, 161/221, 161/217, 29/191.6, 29/195 E
[51] Int. Cl.......................... B60c 9/00, B32b 15/06
[58] Field of Search................. 117/50, 128, 71 M; 161/221, 217; 156/313, 124, 110 C; 152/359, 356, 330, 361 R; 29/191.6

[56] References Cited
UNITED STATES PATENTS
| | | | |
|---|---|---|---|
| 2,226,938 | 12/1940 | McCarthy | 161/221 |
| 2,387,335 | 10/1945 | Leonard | 117/128 X |
| 2,563,113 | 8/1951 | Hindin | 161/221 |
| 2,746,135 | 5/1956 | Harris | 29/195 E |
| 2,792,868 | 5/1957 | Benson | 156/124 |
| 2,895,192 | 7/1959 | Meissner | 117/50 |
| 2,939,207 | 6/1960 | Adler | 29/195 E |
| 3,072,499 | 1/1963 | Cole | 117/50 |
| 3,355,265 | 11/1967 | Hudson | 117/50 |
| 3,642,523 | 2/1972 | Schreiner | 117/128 |

*Primary Examiner*—William J. Van Balen
*Assistant Examiner*—Ellis P. Robinson
*Attorney, Agent, or Firm*—Fitzpatrick, Cella, Harper & Scinto

[57] ABSTRACT

A composite of a metallic material and vulcanized rubber is produced by contacting an unvulcanized rubber with a metallic material plated with a metal selected from the metals of Group IV of the Periodic Table.

16 Claims, 5 Drawing Figures

COMPOSITE OF A METALLIC MATERIAL AND VULCANIZED RUBBER AND PROCESS FOR PRODUCTION THEREOF

BACKGROUND OF THE INVENTION

1. Field of the Invention

This invention relates to a composite of a metallic material and vulcanized rubber and a process for its preparation. More particularly, this invention relates to a composite of a metallic material plated with a metal selected from the metals of Group IV of the Periodic Table and vulcanized rubber and a process for producing the composite.

2. Description of the Prior Art

Rubber is often combined with another material having the properties of low elongation and a high modulus of elasticity so as to utilize, for practical purposes, the physical properties of high elongation and a low modulus of elasticity exhibited by rubber. Recently, the combination of rubber with a metallic material has become very important since tires using steel cords have come into popular use. In a composite consisting of a metallic material and rubber, it is very important that the adhesion strength between the components be sufficient to withstand stress concentration. In standard steel tire cord, friction is caused between the strands of the steel cord by flexural deformation due to the external forces occurring during use and the resulting frictional heat causes heat aging and heat decomposition of the rubber, and further the cord strength is lowered by abrasion due to friction resulting in a shortening of the life of the tire. Therefore, it is also important to enhance the resistance to friction between the steel wires forming the steel cord.

Heretofore, various methods for bonding rubber to a metallic material have been proposed and utilized. For example, a bonding method is known which comprises contacting unvulcanized rubber with a metallic material followed by a vulcanization step. This method has the advantage of not requiring any complicated steps such as coating with adhesives and/or drying steps. This method is exemplified by plating a metallic material with brass and then contacting it with rubber causing a chemical reaction between the copper contained in the brass and the sulfur in the rubber, thereby resulting in a strong bonding between the two components. Another known method involves incorporating a compounding agent such as cobalt naphthenate, cobalt dithiocarbamate and the like, into unvulcanized rubber. The above described methods may also be used in combination in order to obtain a higher adhesion strength.

The composites of a metallic material and vulcanized rubber prepared by the above methods are preferably used under severe working conditions where a dynamic cyclic strain is applied, such as in a tire. However, in these conventional bonding methods, even a minor variation in the manufacturing procedure and/or a high humidity condition may cause a considerable decrease of the adhesion strength resulting in the running life of the composite, such as the steel vehicle tire, being remarkably shortened.

The present inventors have studied the above problem and found that a variation of the water content in unvulcanized rubber affects the adhesion strength. It has further been found that the adhesion strength begins to decrease at a water content of about 0.5% in unvulcanized rubber and rapidly decreases when the water content exceeds 1% in the unvulcanized rubber.

The water present in the unvulcanized rubber usually originates from the water present in the raw rubber or in the compounding agents as well as the atmospheric moisture absorbed from the air in the intermediate storing step. In order to decrease the water content in unvulcanized rubber, a dehumidifying or humidity conditioning processing of the raw rubber and compounding agents is necessary and the production steps in rubber processing such as mastication, mixing, calendering, building, vulcanization, and in particular, the intermediate storing steps should be carried out in a dehumidified or humidity conditioned atmosphere. The above-mentioned control of humidity is, however, extremely difficult in commercial production.

It is also known that fatigue failure of steel cord varies depending upon the twisting structure. The present inventors have found that fatigued steel cord after serviced in vehicle tires have abrasion traces on the strands, and therefore, they have tried to lower the friction between the strands to prevent this. In the prior art, it is suggested that this friction can be lowered by applying a lubricant to the contact points between the strands, but this method is not preferred because a lubricant adversely affects the bonding between the rubber and the steel cord.

SUMMARY OF THE INVENTION

An object of this invention is to provides a composite of a metallic material and vulcanized rubber in which the adhesion strength between the metallic material and the vulcanized rubber is consistently high.

Another object of this invention is to provide a composite of a metallic material and vulcanized rubber in which the adhesion strength is uniform and high and substantially free from the adverse effects of the water content in the raw rubber and the compounding ingredients as well as the water absorbed during the production of the composite.

A further object of this invention is to provide a composite of a metallic material and vulcanized rubber which has high speed durability and high speed stability.

A still further object of this invention is to provide a method for producing a composite of a metallic material and vulcanized rubber.

These objects are achieved by the present invention which provides a composite consisting of a metallic material and vulcanized rubber prepared by contacting an unvulcanized rubber with a metallic material and unifying them by vulcanization, wherein said metallic material is coated with a film of a metal selected from the metals in Group IV of the Periodic Table prior to contacting the metallic material with the unvulcanized rubber. According to another aspect of the present invention, the metallic material may be a steel cord composed of a brass-plated steel wire. The present invention also comprises processes for producing these composites.

DESCRIPTION OF THE PREFERRED EMBODIMENTS

Figure 1:
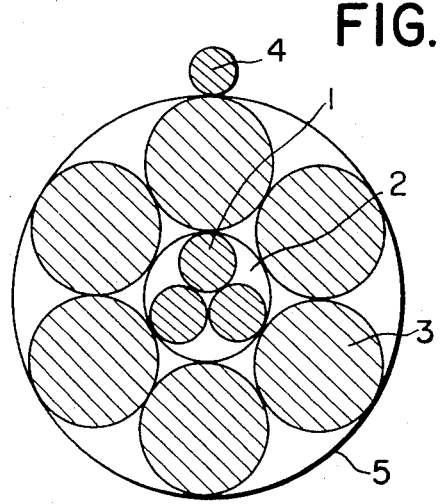
FIG. 1 is a cross section of a steel cord in accordance with the present invention.

Among the metallic materials which may be used in accordance with the present invention are brass, iron, zinc, aluminum, copper, bronze and the like. Brass is preferably used since it results in a strong bonding with rubber even when used under severe dynamic working conditions. Brass containing not less than 50% by weight of copper is a preferred metallic material because its adhesion to rubber and workability are excellent.

The shape of the metallic material used in the present invention may be appropriately selected according to its final product use. In general, the metallic material may be used in the form of a plate, pipe, wire, cord, or the like. A preferred shape is in the form of a cord as cords are extensively used for reinforcing tires since steel reinforced tires are now widely used.

The metals selected from the metals of Group IV of the Periodic Table useful in this invention include tin, lead, titanium, hafnium, and germanium. Tin and lead are preferred Group IV metals from a stabilization standpoint as well as for purpose of economy, and tin is particularly preferred.

A method of coating the metallic material with the Group IV metal may be appropriately selected from the various conventional coating methods such as chemical plating, electrical plating, hot dipping and the like. Chemical plating is preferable from the standpoint of economy, workability and performance.

When tin is the Group IV metal utilized, the chemical plating bath is composed of a water soluble salt of tin such as tin coloride or tin sulfate, in an aqueous acidic solution. When copper or a copper alloy is to be plated, and inhibitor against the acid and a potential modifier such as thiourea are preferably added to the plating bath. An acidic plating bath is preferred from the standpoint of adhesion strength. The metallic material thus plated in a plating bath is washed with water to remove the remaining acid and plating bath composition. Drying of the plated metallic material is not always necessary and even when unvulcanized rubber is contacted with the plated metallic material in a wet state, the adhesion strength is not substantially lowered if vulcanization begins immediately after the contacting. However, when the plated metallic material is exposed to air and allowed to stand for a long period of time at high temperature and humidity, the surface of the Group IV metal thus deposited is oxidized forming a stable oxide film thereby lowering the adhesion strength.

When the thickness of the Group IV metal is too thin, its protection ability is low, and when the thickness is too thick, the adhesion reaction between the rubber and the metal is disturbed. An appropriate range of thickness of the Group IV metal coating is from 0.001 to 0.14 microns (0.01 – 1.00 g/m2 of bonding interface), perferably from 0.02 to 0.05 microns (0.14 – 0.37 g/m2 of bonding interface), and particularly preferred is a range from 0.026 to 0.043 microns (0.19 – 0.31 g/m2 of bonding interface).

When a steel cord is used for reinforcing a rubber article as the metallic material, the coating with the Group IV metal may be carried out at any time as long as it is after the brass plating, for example the coating with Group IV metal may be carried out before the drawing step or after the drawing step.

If the coating with the Group IV metal is effected immediately after the brass-plating, the drying step of said brass-plating may be advantageously avoided. Further, if the coating with the Group IV metal is effected before the twisting step, the friction between the strands of the steel cord under dynamic working conditions can be decreased.

Various conventional twisting structures of steel cord for reinforcing a rubber article may be appropriately used in the present invention. According to the present invention, there may be used a twisting structure which shows high friction and is normally not suitable for use under dynamic working conditions.

As the unvulcanized rubber to be contacted with the metallic material coated with the Group IV metal there may be mentioned natural rubber and synthetic rubber such as styrene butadiene rubber, butadiene rubber, isoprene rubber, ethylene propylene terpolymer rubber, nitrilebutadiene rubber, chloroprene rubber and the like.

Conventional methods of contacting a metallic material and an unvulcanized rubber and conventional methods of vulcanizing the unvulcanized rubber contacted with the metallic material may be utilized.

According to the present invention, it is not necessary to pay any undue attention to moisture present in the production of a composite of the metallic material and vulcanized rubber nor is the composite adversely affected by water absorbed in the unvulcanized rubber during the production process. The resulting product exhibits a high and uniform adhesion strength.

In addition, when a steel cord for reinforcing a rubber article is used as the metallic material, the adhesion strength with the vulcanized rubber is high even under dynamic working conditions as in the case of tires and belts, and furthermore, abrasion between the strands of the steel cord is low and thereby does not cause undesired friction heat. Therefore, high speed durability and high speed safety are greatly improved and there is also an improved workability in the drawing operation in the steel cord manufacturing as well as improved preservation of the resulting cord.

The composite of the present invention is highly resistant to overvulcanization and particularly when the unvulcanized rubber contains some water, the adhesion strength between the metallic material and the vulcanized rubber is very high even when overvulcanization has occurred. Therefore, the present invention is particularly suitable for a large composite susceptible to overvulcanization such as an off-the road tire.

The water content in unvulcanized rubber affects the adhesion between a metallic material and vulcanized rubber. It has now been found that when a metallic material is coated by a thin film of a Group IV metal, this Group IV metal forms a layer on the surface of the metallic material to protect it from moisture in the beginning stages of vulcanization where the effect of the water content in the unvulcanized rubber is large. This film then diffuses into the rubber at the advanced stages of vulcanization where the metallic material and rubber substantially combine resulting in a new surface of the metallic material bonded with rubber; said surface having a higher adhesionability.

The following examples are given merely as illustrations of the present invention and it is to be understood that the invention is not limited thereto. In the examples, parts and percents are by weight unless otherwise specified.

EXAMPLE 1

Plates (150.0 × 25.4 × 3.0 mm) of brass (Cu : 70%, Zn : 30%), carbon steel, aluminum, copper, and bronze plated chemically with tin in a thickness of about 0.05 microns were prepared as metallic materials. Each metallic material was unified with the unvulcanized rubber lited in Table 1 by vulcanizing for one hour at 145°C. Water was added to the above mentioned unvulcanized rubber after mixing, and the water content was determined by gas chromatography and volatilized weight just before the vulcanization step. The adhesion strength was measured by a Load-cell type tension tester (Separation Speed : 50 mm/min.), and the results are shown in Table 2.

Table 1

|  | Parts |
| --- | --- |
| Natural rubber | 100 |
| FEF Carbon black | 50 |
| ZnO | 7 |
| S | 3 |
| N cyclohexylbenzothiazylsulphenamide | 0.5 |
| Phenyl-$\beta$-naphthylamine | 1 |
| Alkyl phenol resin | 5 |
| Cobalt naphthenate | 3 |

Table 2

| Metallic Material | Adhesion | Adhesion strength (Kg/in.) | | |
| --- | --- | --- | --- | --- |
| | Water content | 0.4% | 1.4% | 3.4% |
| Brass | Treated | 47 | 45 | 40 |
| | Untreated | 39 | 14 | 0 |
| Carbon steel | Treated | 35 | 33 | 40 |
| | Untreated | 37 | 30 | 22 |
| Aluminum | Treated | 15 | 30 | 70 |
| | Untreated | 5 | 10 | 40 |
| Zinc | Treated | 35 | 40 | 70 |
| | Untreated | 38 | 35 | 30 |
| Copper | Treated | 28 | 25 | 17 |
| | Untreated | 0 | 0 | 0 |
| Bronze | Treated | 35 | 39 | 34 |
| | Untreated | 25 | 0 | 0 |

It should be noted that "Treated" refer to a metallic material plated with a Group IV metal, e.g., in Table 2 above, tin is used and "Untreated" refers to a metallic material not plated with the Group IV metal.

It is clear from Table 2 above, that the adhesion strength of the treated metallic materials is higher than the adhesion strength of the untreated metallic material when the water content in the unvulcanized rubber is not less than 1.4%.

EXAMPLE 2

A brass plate prepared as in Example 1, was chemically plated with lead in a thickness of 0.07 microns and contacted with an unvulcanized rubber and it was thereafter vulcanized.

The adhesion strength of the resulting composite is shown in Table 3 below.

Table 3

| Metallic Material | Adhesion | Adhesion strength (Kg/in.) | | |
| --- | --- | --- | --- | --- |
| | Water content | 0.4% | 1.4% | 3.4% |
| | Treated | 57 | 50 | 35 |
| | Untreated | 39 | 14 | 0 |

These results show that lead yields the same good results as tin.

EXAMPLE 3

As a metallic material, a steel cord for use in a tire was prepared and the construction of this cord was (1 × 3 + 6 × 1) + 1 as illustrated in FIG. 1, in which the three filaments 1 (diameter of each filament, 0.20 mm) were twisted together to form a center strand 2, and six strands 3 (diameter of each strand, 0.38 mm) and one outer layer 4 of 0.15 mm in diameter were twisted together about the center strand 2 to form a cord 5. Each filament 1, each strand 3 and a strand 4 were plated with brass (Cu : 70%, Zn : 30%) in a thicknes of 0.5 microns.

The cord was plated with tin in a plating bath having the composition as shown below.

Table 4

| Stannous chloride | 0.5 g. |
| --- | --- |
| Thiourea | 10 g. |
| Sulfuric acid | 1.0 g. |
| Water | 1.0 l. |

The thickness of the tin to be coated was controlled by changing the dipping time in the plating bath, and the thickness of the tin was calculated from the deposited amount of tin determined by polarography. 18 steel cords were embedded into an unvulcanized rubber as used in Example 1, each steel cord being separated from the adjacent cords by 2.5 mm in the mold, and the rubber was vulcanized for an hour at 145° C.

Figure 2:
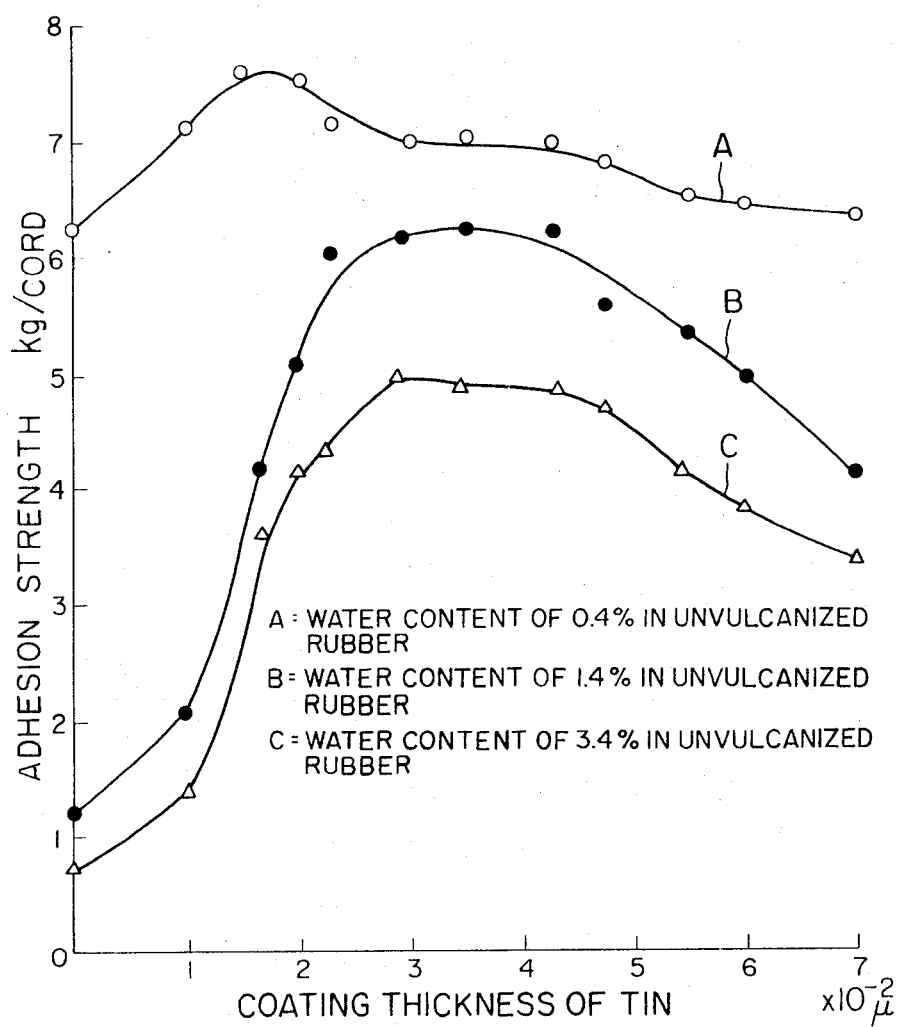
FIG. 2 is a graph showing the relation between the thickness of a tin plating on brass plated on a steel cord and the adhesion strength between the steel cord and the vulcanized rubber.

The adhesion strength was measured by the same method as in Example 1. The rubber covering the surface of the one side of the steel cords was removed and then three alternate steel cords were selected and used as samples and the adhesion strength were determined by the average value of test results of these samples. The results are shown in FIG. 2.

These results show that this invention is effective over a wide range of thickness of tin coatings and that the optimum coating thickness of tin is dependent upon the water content in the unvulcanized rubber.

EXAMPLE 4

The procedure of Example 3 was repeated using various unvulcanized rubbers and the adhesion strength of the resulting composites was determined. The coating thickness of the tin of the steel cord was 0.033 microns.

The results are shown in the table below.

Table 5

|  | Compound A in parts | Compound B in parts | Compound C in parts |
|---|---|---|---|
| Natural Rubber | 85 | 60 |  |
| Polybutadiene Rubber | 15 |  |  |
| Polychloroprene Rubber |  | 40 |  |
| Styrene-Butadiene Rubber |  |  | 100 |
| Carbon black | 50 | 50 | 50 |
| Zinc oxide | 15 | 15 | 7 |
| Sulfur | 3 | 3 | 3 |
| Oxydiethylene benzothiazyl sulfene amide | 1 | 1 |  |
| N-cyclohexyl benzothiazyl sulfene amide |  |  | 0.5 |
| Phenyl-β-naphthyl amine | 1 | 1 | 1 |
| Alkylphenolic resin | 5 | 5 | 5 |
| Cobalt naphthenate | 3 | 3 | 3 |

|  | Adhesion strength (Kg/cord) | | | | | |
|---|---|---|---|---|---|---|
|  | Compound A | | Compound B | | Compound C | |
| Water content Metallic Material | 1.67% | 2.75% | 0.95% | 1.91% | 1.23% | 2.35% |
| Treated | 6.9 | 5.8 | 6.2 | 7.9 | 3.6 | 4.7 |
| Untreated | 4.8 | 1.3 | 2.0 | 1.6 | 1.8 | 0.7 |

It is clear from the above table that the composites of this invention are effective over a wide range of rubber compounds.

EXAMPLE 5

Following the procedure of Example 1, except employing various brass plates having a different composition from those of Example 1, the resulting adhesion strength was measured. The water content in the unvulcanized rubber was 1.4%. The results are shown in the table below.

Table 6

|  | Adhesion strength (Kg/in) | | | | |
|---|---|---|---|---|---|
| Cu:Zn Metallic Material | 50:50 | 60:40 | 70:30 | 80:20 | 100:0 |
| Treated | 50 | 52 | 45 | 38 | 39 |
| Untreated | 35 | 38 | 14 | 0 | 0 |

The adhesion strength of the untreated brass plate was remarkably reduced as the copper content increased whereas, to the contrary, the adhesion strength of the treated brass plate was reduced very little. This invention is thus effective in the case where the brass plate contains 50% Cu.

EXAMPLE 6

Plating with a Group IV metal was carried out at various different stages of the manufacturing process and the adhesion strength and friction resistance with respect to the resulting composite were measured.

The structure of the steel cord sample used was 1 × 3 + 6 × 1 and this structure is the same as the structure in Example 3 (cf. FIG. 1) except that the outer layer 4 in FIG. 1 is removed. The diameter of a filament of the center strand was 0.20 mm and the diameter of each of the six strands was 0.38 mm. The filaments and strands were plated with brass (Cu : 70%, Zn : 30%) to a final thickness of 0.21 microns and then plated with tin a to a thickness of 0.031 microns in a manner similar to the manner shown in Example 3.

Compounding of the unvulcanized rubber, contacting the unvulcanized rubber with the steel cord, vulcanization, and the measuring of the adhesion strength were carried out in a manner similar to the manner shown in Example 3. The unvulcanized rubber was permitted to stay in the atmosphere at 40° C and 98% RH in order to absorb moisture.

The friction resistance of the steel cord was measured after said cord was bent repeatedly by a bending fatigue testing machine (dia. of pulley: 40 mm, frequency: 40cpm.). The strength of each of three filaments taken out of the fatigued steel cord was measured, and the strength of a filament of a strand was shown by the average value thus measured.

The abrasion width with respect to the direction of axis of the strand in ten elliptical abrasion traces on the surface of filaments constituting strands of the fatigued cord were measured by an optical microscope, and the abrasion between the strands was shown by the average value thus measured.

The higher the strength of the filaments constituting a strand and the smaller abrasion between the strands, the larger the abrasion resistance.

Steel cord A

A steel wire 1.37 mm in diameter was chemically plated with brass and then chemically plated with tin, and thereafter subjected to a cold drawing to form a wire of 0.38 mm in diameter.

Six tin plated wires of 0.38 mm in diameter thus obtained and one center strand not tin plated as used in Example 3 were twisted to produce Steel cord A.

Steel cord B

Steel cord B was formed by chemically plating a steel wire of 1.37 mm in diameter with brass, applying cold drawing thereto, then chemically plating with tin to form a wire of 0.38 mm in diameter, and twisting six pieces of the resulting wire as above with a center strand as used in Example 3.

Steel cord C

Steel cord C was produced by twisting a center strand as used in Example 3 with six steel wires plated with brass (diameter of each wire: 0.38 mm) obtained by chemically plating a steel wire 1.37 mm in diameter with brass and applying a cold drawing thereto, and thereafter chemically plating the resulting cord with tin.

Steel cord D

Steel cord D was prepared in the same manner as Steel cord C above except that the step of tin plating was not carried out.

The results of tests on the above formed wires are shown in the table below.

to form a center strand and seven filaments were twisted together to form a strand, five of which were twisted together about a center strand to form a cord. The diameter of each of the filaments was 0.15 mm.

The abrasion between the strands and the filament strength of a filament constituting a strand were measured by the same method as in Example 6.

The test results show that filament strength decreases with an increase in the abrasion between the strands. In this experiment, cord breaking began to occur at 150,000 Km running time.

EXAMPLE 8

A steel cord tire for trucks and busses (tire size: 10.00 – 20) was produced by using, as a breaker, a steel cord having a tin coating of a thickness of 0.033 mi- Table 7

| Metallic Material | Repeated Number | Steel Cord A (Treated) | Steel Cord B (Treated) | Steel Cord C (Treated) | Steel Cord D (Untreated) |
| --- | --- | --- | --- | --- | --- |
| Strength of filament consisted of a strand (Kg/filament) | 0 | 25.6 | 25.8 | 25.5 | 25.5 |
| | 500 | 26.4 | 26.8 | 26.3 | 26.2 |
| | 1000 | 26.5 | 25.3 | 22.8 | 22.0 |
| | 1500 | 25.5 | 25.0 | 17.7 | 17.3 |
| Abrasion between strands (Micron/filament) | 300 | 8 | 15 | 20 | 22 |
| | 500 | 18 | 25 | 34 | 38 |
| | 1000 | 67 | 82 | 105 | 118 |
| | 1500 | 98 | 120 | 219 | 232 |

Table 8

| Time of standing in 40 deg. C 98% Rh hours | Water content in unvulcanized rubber % | Adhesion strength (Kg/Cord) | | | |
| --- | --- | --- | --- | --- | --- |
| | | Steel Cord A | Steel Cord B | Steel Cord C | Steel Cord D |
| 0 | 0.4 | 9.8 | 10.5 | 10.9 | 8.7 |
| 20 | 0.7 | 8.0 | 8.6 | 8.9 | 4.5 |
| 40 | 1.0 | 7.1 | 8.0 | 8.0 | 2.4 |
| 60 | 1.3 | 6.9 | 7.2 | 7.4 | 1.6 |
| 80 | 1.5 | 6.8 | 7.0 | 7.1 | 1.4 |
| 120 | 1.7 | 6.7 | 7.0 | 6.9 | 1.4 |

Figure 3:
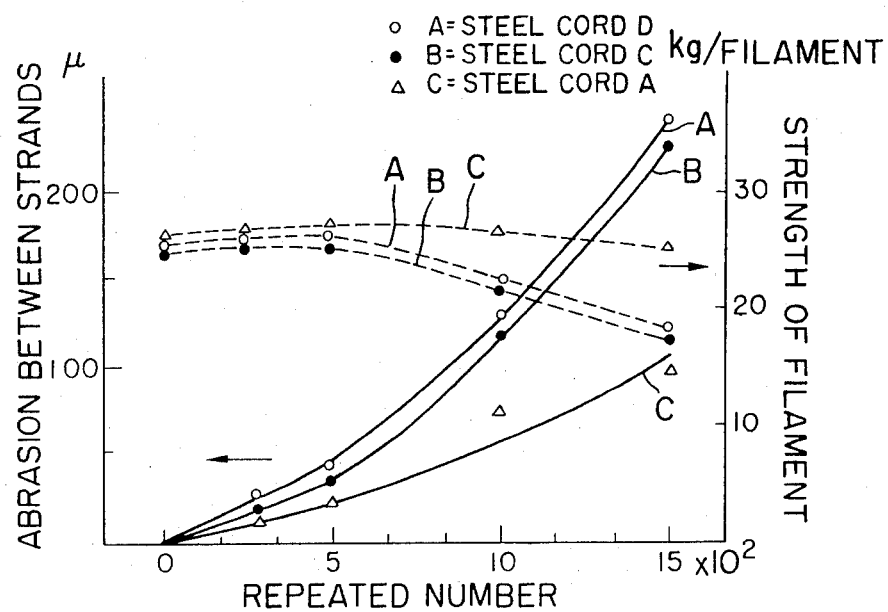
FIG. 3 is a graph showing the state of variation of abrasion between the strands and the filament strength caused by a repeated flexing of the cords.

The strength of a filament consisting of a strand and the abrasion between strands are shown in FIG. 3.

The steel cord plated with tin has a higher adhesion than a steel cord not plated with tin, and the steel cords consisting of filaments and strands plated with tin such as Steel cord A and Steel cord B have a high resistance to friction between the filaments.

These tests also show that it is more effective to use filaments plated with tin as the center strand than center strands not plated with tin.

EXAMPLE 7

Figure 4:
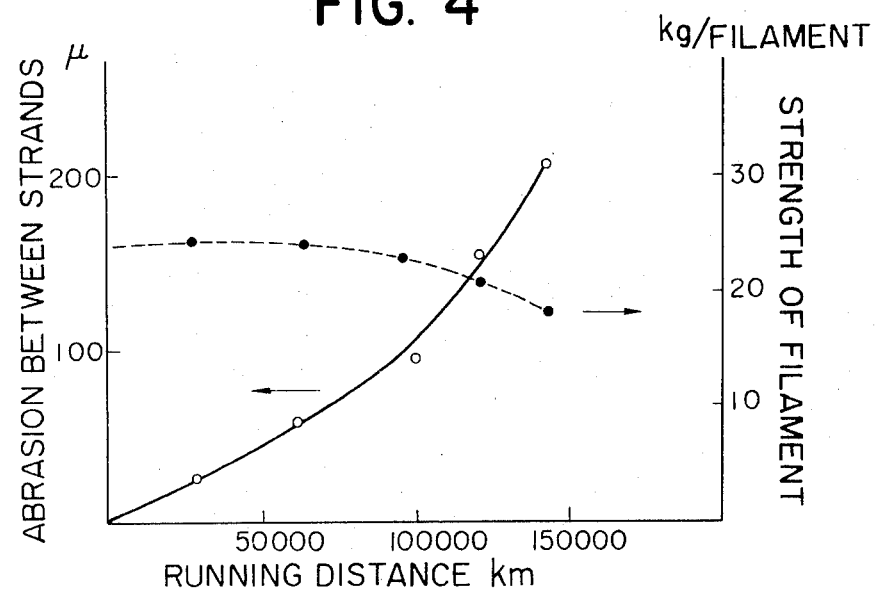
FIG. 4 is a graph showing the state of variation of abrasion between the strands and the filament strength based on a running test of a commercial steel cord tire.

The relation between the distance of use and the abrasion between the strands and the relation between the distance of use and the filament strength of a strand were obtained by a running test of a steel radial tire on a truck using the usual steel cords as plies. The results are shown in FIG. 4.

The size of the above steel radial tire was 10.00 – 20, and the structure of the steel cord of the said tire was $1 \times 3 + 5 \times 7$; i.e., three filaments were twisted together crons as shown in Example 3 with various water content in the unvulcanized rubber, and conventional building and vulcanization steps.

The resulting tire was tested by a drum tester together with a conventional tire using steel cords which were not plated with tin and the running distance causing a separation in the tire and breaking was measured. The results are shown in FIG. 5.

Figure 5:
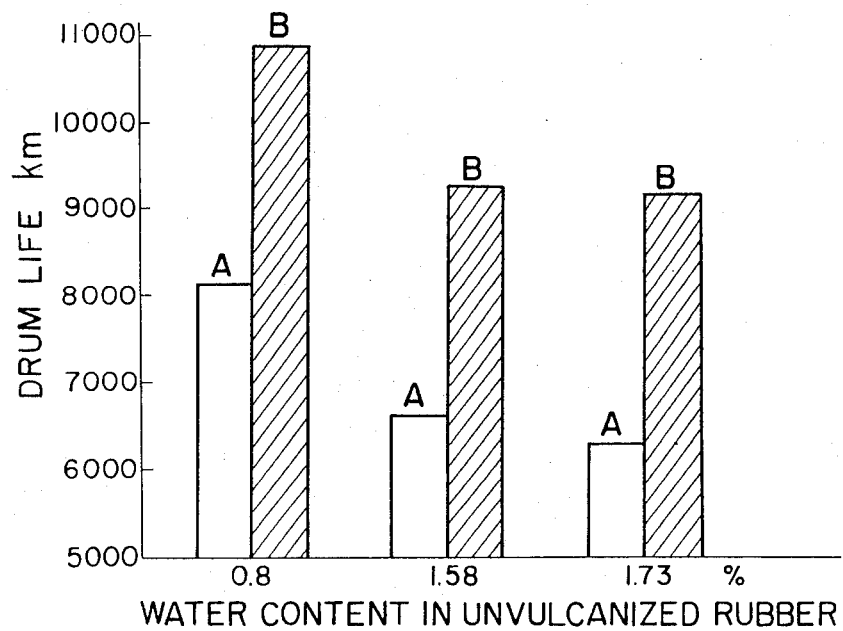
FIG. 5 is a graph showing the relation between the water content in unvulcanized rubber and the endurance time in a commercial steel cord tire A and a steel cord tire B prepared according to the present invention.

In FIG. 5, A is a conventional tire using untreated steel cords, and B is a tire of the present invention using treated steel cords. These results indicate that the tire reinforced with steel cords treated according to the present invention maintains a very high durability despite increasing water content in the unvulcanized rubber.

EXAMPLE 9

The adhesion strength for various vulcanization times was measured in a manner similar to Example 3 with steel cords plated with tin in a thickness of 0.033 microns. The results are shown in the table below.

Table 9

| Water content in unvulcanized rubber | Vul. time Metallic Material | Adhesion strength (Kg/cord) | | | | |
|---|---|---|---|---|---|---|
| | | 60 min. | 100 min. | 200 min. | 300 min. | 400 min. |
| 0.4% | Treated | 6.1 | 5.3 | 4.9 | 4.2 | 3.5 |
| | Untreated | 6.2 | 5.8 | 4.5 | 3.0 | 2.8 |
| 1.4% | Treated | 5.2 | 5.0 | 4.7 | 4.7 | 4.7 |
| | Untreated | 1.2 | 1.0 | 0.9 | 0.9 | 0.8 |

It should be noted that the usual time of vulcanization is less than 60 min. The results show that the adhesion strength of the untreated cord decreases remarkably with overvulcanization but the adhesion strength of the treated cord decreases only slightly.

EXAMPLE 10

Following the precedure of Example 3, the adhesion strength of a steel cord prepared using a tin plating bath of a highly concentrated composition was measured.

The bath composition was as follows:

Table 10

| Stannous chloride | 5 g. |
|---|---|
| Thiourea | 100 g. |
| Sulfuric acid | 10 g. |
| Water | 1 l. |

The dipping time in the plating bath was 3 seconds and thickness of the plated tin was 0.03 microns.

The results are shown in the table below.

Table 11

| Adhesion Water content Steel cord | Adhesion strength (Kg/cord) | | |
|---|---|---|---|
| | 0.4% | 1.4% | 3.4% |
| Treated | 5.7 | 6.1 | 5.4 |
| Untreated | 6.1 | 1.2 | 0.8 |

These results indicate that a tin-plating method such as the above in which a high concentration bath is used for a short dipping time is equally operable as a conventional tin-plating method using a low concentration bath for a long dipping time.

We claim:

1. A composite formed by vulcanizing a rubber article containing steel reinforcement comprising a steel central core, and an inner coating of a metallic material for said core of a brass adapted to bond to said rubber article and an outer coating of a Group IV metal of the Periodic Table, said outer coating having a thickness from about 0.001 to 0.14 microns.

2. A process for forming a tire of a metallic material and vulcanized rubber which comprises contacting a brass coated steel core metallic material and an unvulcanized rubber and unifying them by vulcanization characterized in that the brass coated metallic material is coated with a film from about 0.001 to 0.14 microns thick of a metal selected from the metals of Group IV of the Periodic Table prior to contacting the metallic material with the unvulcanized rubber.

3. A composite according to claim 1 wherein the metal selected from the metals in Group IV of the Periodic Table is tin or lead.

4. A composite according to claim 1 wherein the metal selected from the metals in Group IV of the Periodic Table is tin.

5. A composite according to claim 1 wherein the metal selected from the metals in Group IV of the Periodic Table is lead.

6. A composite according to claim 1 wherein the thickness of the metal selected from the metals of Group IV of the Periodic Table coated on the metallic material ranges from 0.01 to 0.07 microns.

7. A composite according to claim 1 wherein the thickness of the metal selected from the metals of Group IV of the Periodic Table coated on the metallic material ranges from 0.02 to 0.05 microns.

8. A composite according to claim 1 wherein the metallic material is coated with the metal selected from the metals of Group IV of the Periodic Table by a chemical plating process.

9. A composite according to claim 1 wherein the inner coating of brass contains at least 50% copper by weight.

10. A composite according to claim 1 wherein the steel reinforcement is a steel cord for reinforcing a rubber article composed of a brass-plated steel wire which is coated with tin and then drawn and twisted.

11. A composite according to claim 1 wherein the steel reinforcement is a steel cord for reinforcing a rubber article composed of a brass-plated steel wire which is drawn, coated with tin and then twisted.

12. A composite according to claim 1 wherein the metallic material is a steel cord for reinforcing a rubber article composed of a brass-plated steel wire which is drawn, twisted and then coated with tin.

13. A composite according to claim 1 wherein said composite is a tire.

14. A process according to claim 2 wherein the metallic material is a brass-plated steel wire for reinforcing a rubber article which is coated with tin and then subjected to drawing and twisting.

15. A process according to claim 2 wherein the metallic material is a brass-plated steel wire for reinforcing a rubber article which is subjected to drawing, then coated with tin and twisted.

16. A process according to claim 2 wherein the metallic material is a brass-plated steel wire for reinforcing a rubber article which is subjected to drawing, twisted and then coated with tin.

* * * * *